(12) United States Patent
Katz (10) Patent No.: US 6,393,303 B1
(45) Date of Patent: May 21, 2002

(54) METHOD AND APPARATUS FOR DIRECTIONAL RADIO COMMUNICATION

(75) Inventor: Marcos Katz, Oulu (FI)

(73) Assignee: Nokia Telecommunications Oy, Espoo (FI)

( * ) Notice: Subject to any disclaimer, the term of this patent is extended or adjusted under 35 U.S.C. 154(b) by 0 days.

(21) Appl. No.: 09/367,240

(22) PCT Filed: Feb. 13, 1997

(86) PCT No.: PCT/EP97/00664

§ 371 Date: Sep. 17, 1999

§ 102(e) Date: Sep. 17, 1999

(87) PCT Pub. No.: WO98/36596

PCT Pub. Date: Aug. 20, 1998

(51) Int. Cl.[7] ................................................ H04B 1/38
(52) U.S. Cl. ........................ 455/562; 455/63; 455/561; 342/359; 342/368
(58) Field of Search .............................. 455/561, 562, 455/63, 67.1, 67.3, 73, 269, 277.1, 277.2; 342/359, 360, 368, 383; 370/334, 342, 347

(56) References Cited

U.S. PATENT DOCUMENTS

| 5,515,378 A | 5/1996 | Roy, III et al. |
| 5,576,717 A | * 11/1996 | Searle et al. ................ 342/373 |
| 5,610,617 A | 3/1997 | Gans et al. |
| 5,621,752 A | 4/1997 | Antonio et al. |
| 5,771,017 A | 6/1998 | Dean et al. |
| 5,856,804 A | 1/1999 | Turcotte et al. |
| 5,884,187 A | 3/1999 | Ziv et al. |
| 5,893,033 A | 4/1999 | Keskitalo et al. |
| 5,894,598 A | 4/1999 | Shoki |
| 5,999,800 A | * 12/1999 | Choi et al. ................... 455/562 |
| 6,018,643 A | * 1/2000 | Golemon et al. ........... 455/562 |
| 6,097,970 A | * 8/2000 | Angus et al. ................ 455/562 |
| 6,233,466 B1 | * 5/2001 | Wong et al. ................. 455/562 |

FOREIGN PATENT DOCUMENTS

| EP | 647 978 | 4/1995 |
| EP | 715 478 | 6/1996 |
| EP | 729 285 | 8/1996 |
| EP | 755 090 | 1/1997 |
| EP | 755 093 | 1/1997 |
| WO | 96/00466 | 1/1996 |
| WO | 96/09696 | 3/1996 |
| WO | 96/37969 | 11/1996 |

* cited by examiner

*Primary Examiner*—Nay Maung
*Assistant Examiner*—Quochien B. Vuong
(74) *Attorney, Agent, or Firm*—Merchant & Gould P.C.

(57) ABSTRACT

A method of directional radio communication between a first station and a second station comprises the following steps. A first signal transmitted from the second station is received at the first station. The first signal is receivable from a plurality of different directions. A principle beam direction from which the first signal is received by the first station is determined. A plurality of beam directions for transmitting a radiation beam is defined at the first station. Each of the beam directions is selectable. The determined principle beam direction and at least one other auxiliary beam direction is selected at the first station. The at least one auxiliary beam direction is adjacent to the determined principle beam direction. A second signal is transmitted from the first station to the second station in the selected beam direction.

17 Claims, 4 Drawing Sheets

METHOD AND APPARATUS FOR DIRECTIONAL RADIO COMMUNICATION

The present invention relates to a method and apparatus for directional radio communication in which signals between a first station and a second station may be transmitted only in certain directions. In particular, but not exclusively, the present invention is applicable to cellular communication networks using space division multiple access.

With currently implemented cellular communication networks, a base transceiver station (BTS) is provided which transmits signals intended for a given mobile station (MS), which may be a mobile telephone, throughout a cell or cell sector served by that base transceiver station. However, space division multiple access (SDMA) systems have now been proposed. In a space division multiple access system, the base transceiver station will not transmit signals intended for a given mobile station throughout the cell or cell sector but will only transmit the signal in the beam direction from which a signal from the mobile station is received. SDMA systems may also permit the base transceiver station to determine the direction from which signals from the mobile station are received.

SDMA systems may allow a number of advantages over existing systems to be achieved. In particular, as the beam which is transmitted by the BTS may only be transmitted in a particular direction and accordingly may be relatively narrow, the power of the transceiver can be concentrated into that narrow beam. It is believed that this results in a better signal to noise ratio with both the signals transmitted from the base transceiver station and the signals received by the base transceiver station. Additionally, as a result of the directionality of the base transceiver station, an improvement in the signal to interference ratio of the signal received by the base transceiver station can be achieved. Furthermore, in the transmitting direction, the directionality of the BTS allows energy to be concentrated into a narrow beam so that the signal transmitted by the BTS can reach far away located mobile stations with lower power levels than required by a conventional BTS. This may allow mobile stations to operate successfully at greater distances from the base transceiver station which in turn means that the size of each cell or cell sector of the cellular network can be increased. As a consequence of the larger cell size, the number of base stations which are required can also be reduced leading to lower network costs. SDMA systems generally require a number of antenna elements in order to achieve the required plurality of different beam directions in which signals can be transmitted and received. The provision of a plurality of antenna elements increases the sensitivity of the BTS to received signals. This means that larger cell sizes do not adversely affect the reception of signals by the BTS from mobile stations.

SDMA systems may also increase the capacity of the system, that is the number of mobile stations which can be simultaneously supported by the system is increased. This is due to the directional nature of the communication which means that the BTS will pick up less interference from mobile stations in other cells using the same frequency. The BTS will generate less interference to other mobile stations in other cells using the same frequency when communicating with a given MS in the associated cell.

Ultimately, it is believed that SDMA systems will allow the same frequency to be used simultaneously to transmit to two or even more different mobile stations which are arranged at different locations within the same cell. This can lead to a significant increase in the amount of traffic which can be carried by cellular networks.

SDMA systems can be implemented in analogue and digital cellular networks and may be incorporated in the various existing standards such as GSM, DCS 1800, TACS, AMPS and NMT. SDMA systems can also be used in conjunction with other existing multiple access techniques such as time division multiple access (TDMA), code division multiple access (CDMA) and frequency division multiple access (FDMA) techniques.

One problem with SDMA systems is that the direction in which signals should be transmitted to a mobile station needs to be determined. In certain circumstances, a relatively narrow beam will be used to send a signal from a base transceiver station to a mobile station. Therefore, the direction of that mobile station needs to be assessed reasonably accurately. As is known, a signal from a mobile station will generally follow several paths to the BTS. Those plurality of paths are generally referred to as multipaths. A given signal which is transmitted by the mobile station may then be received by the base transceiver station from more than one direction due to these multipath effects.

Examples of patents which relate to methods and apparatus for directional radio communication include WO-A-96/37969, EP-A-0647978 and EP-A-0729285. In particular, WO-A-96/37969 discloses base station equipment for receiving a signal by means of an antenna group and including a receiver which monitors at all times the directions from which the best signal components from mobile stations are received. This information can also be used in the base station equipment in the downlink direction. A transmitter unit phases the signal in such a way that the angles of the greatest gain of the or each antenna beam point in the desired directions.

An additional problem is that the direction in which a signal is to be transmitted by the BTS to the mobile station is determined on the basis of the uplink signals received by the BTS from the mobile station. However, the frequencies of the down link signals transmitted from the mobile station to the BTS are different from the frequencies used for the signals transmitted by the BTS to the mobile station. The difference in the frequencies used in the uplink and downlink signals means that the behaviour of the channel in the uplink direction may be different from the behaviour of the channel in the downlink direction. Thus the optimum direction determined for the uplink signals will not always be the optimum direction for the downlink signals.

Embodiments of the present invention seek to provide an improved method and apparatus for directional radio communication.

According to a first aspect of the present invention, there is provided a method of directional radio communication between a first station and a second station, said method comprising the steps of:

receiving at said first station a first signal transmitted from said second station, said first signal being receivable from a plurality of different directions;

determining a principal beam direction from which said first signal is received by said first station;

defining at the first station a plurality of beam directions for transmitting a radiation beam, wherein each of said beam directions is selectable; and selecting at said first station said determined principal beam direction and at least one other auxiliary beam direction, said at least one auxiliary beam direction being adjacent to said determined principal beam direction and transmitting a second signal from said first station to said second station in said selected beam directions, wherein the transmission power in each of said beam directions is individually determinable and wherein the strength of the second signal transmitted in said at least one auxiliary direction is less than the strength of the second signal transmitted in said determined principal direction.

By using this method, the probability that the signal transmitted by the first station will be received by the second station is increased. As the strength of the second signal transmitted by the second station in the auxiliary direction is dependent on a parameter of the first signal received in that direction, it is possible, for example, if a relatively strong signal is received by the second station in the at least one auxiliary direction to transmit a relatively strong signal to the first station in the at least one auxiliary direction.

In practice, the first signal may be received by the first station from a plurality of directions. Only one of those directions is selected as the determined principal direction. The determined principal direction may be selected in a number of different ways. For example, the determined principal direction may be selected as being the direction from which the first signal is received by the first station with the greatest energy or strength. Alternatively, the determined principal direction may be selected as being the direction from which the first signal is first received by the first station. This corresponds to the signal having followed the shortest path, which may be the line of sight path.

In one embodiment of the present invention, the first signal includes a known data sequence and the method further comprises the steps of correlating the received data signals with the known data sequence in order to obtain the channel impulse response. In one preferred embodiment the received data signals are correlated with a locally generated replica of the known data sequence. The channel impulse response is used to determine which direction is to be the principal direction. For example, the channel impulse response may be determined for each of the channels corresponding to different directions from which the first signal might have been received. The channel impulse response thus received is a measure of the available amount of the desired signal received from the first station. Some parameters of the channel impulse response of each channel may be compared with one another in order to ascertain which of the directions provides the first signal with maximum energy or the minimum delay. The signal with the minimum delay is the signal first received by the first station.

The at least one auxiliary direction may comprise the directions on either side of the determined principal direction.

Preferably, the strength of the said second signal in said at least one auxiliary direction is less than or equal to the strength of the second signal in the determined principal direction.

Preferably, said method comprises the step of defining at the first station a plurality of beam directions for transmitting a radiation beam, wherein each of said beam directions is individually selectable. The transmission power for each of the beam directions may be individually determinable, wherein the transmission power of the beam in the or each auxiliary direction is less than the transmission power in the direction of the principal beam.

In one embodiment of the present invention, the ratio of the strength of the second signal in said at least one auxiliary direction to the strength of the second signal in said determined principal direction is proportional to the ratio of the strength of the first signal received by the first station from said at least one auxiliary direction to the strength of the first signal received by the first station in said determined principal direction. Preferably, these two ratios are equal.

Preferably, if the strength of the first signal received in said at least one auxiliary direction is very much less than the strength of the first signal received in the direction of the determined principal direction, then said second signal is transmitted from the first station to the second station only in said determined principal direction. However, if the strength of the first signal received in said determined principal direction and said at least one auxiliary direction are substantially the same, then the first station is arranged to transmit that second signal in the determined principal direction and in said at least one auxiliary direction at substantially the same signal strength. Thus, when it is determined that the first signal is mostly received from the determined principal direction, then the second signal is only transmitted in that direction. However, if it is determined that the first signal is received with approximately the same strength from two or more directions, then the second signal will be transmitted in those two or more directions with substantially the same strength. There will of course be situations between these two limit cases in which the strength of the second signal in said at least one auxiliary direction will be smaller than the strength of the second signal in the determined principal direction.

Preferably the strength of the second signal transmitted by the first station in at least one of said determined principal direction and the at least one auxiliary direction is dependent on the strength of first signal received by the first station in the respective directions. The strength of the second signal in at least one of the determined principal direction and said at least one auxiliary direction may be dependent on the average strength of a plurality of preceding signals received at the first station from the second station. In one preferred embodiment, the strength of the second signal in one of said determined principal direction and said at least one auxiliary direction is dependent on the strength of said first signal received in the respective direction and the strength of the second signal in the other of said determined principal direction and said at least one auxiliary direction is dependent on the average strength of a plurality of preceding signals received at said first station from said second station in the respective direction. It is preferred that the strength of the second signal in the determined principal direction be based on the strength of the first signal whilst the strength of the second signal in the at least one auxiliary direction be determined on the basis of the average strength of a plurality of preceding signals received from the second station. Thus, the power in the principal direction could be updated on every received signal to rapidly try to follow channel changes affecting the path between the first and second stations In contrast the Dower in the at least one auxiliary direction may respond slowly to changes to try to increase the level of signal received by the second station. This may lead to an increased probability that a signal from the first station will be received by the second station.

A beam in said the or one of the at least one auxiliary direction may overlap a beam defined in the determined principal beam direction. In one proposal, the or one of the at least one auxiliary beam will overlap up to half of the angular spread of the determined principal beam.

Preferably, the method includes the step of determining if the distance of the second station from the first station is below a predetermined value, and if so then the second signal transmitted from said first station to said second station is transmitted with a relatively wide angular spread.

In particular, the total angular spread achieved is preferably greater than that achieved when the distance between the first and second stations is above the predetermined value and the principal direction and at least one other auxiliary direction are used for transmitting said signal.

According to a second aspect of the present invention, there is provided a first station for directional radio communication with a second mobile station, said apparatus comprising:

receiver means for receiving a first signal transmitted by said second station, said first signal being receivable from a plurality of different directions;

determining means for determining the principal direction from which said first signal is received;

transmitter means for transmitting a second signal from the first station to the second station, said transmitter means being arranged to transmit a radiation beam in a plurality of beam directions, wherein each of said beam directions is selectable; and control means for controlling said transmitter means, wherein said control means is arranged to control the said transmitter means to transmit said second signal to said second station in the determined principal beam direction, said at least one auxiliary direction being adjacent to the determined principal direction, wherein the transmission power in each of said beam directions is individually determinable and wherein the strength of the second signal transmitted in said at least one auxiliary direction is less than the strength of the second signal transmitted in said determined principal direction.

The receiver means and the transmitter means may comprise an antenna array which is arranged to provide a plurality of signal beams in a plurality of different directions. The antenna array may comprise a phased antenna array or may comprise a plurality of separate antenna elements each of which is arranged to provide a beam in a defined direction. Two separate arrays may be provided, one to receive signals and the other to transmit signals. Alternatively a single array may be provided both to receive and to transmit signals.

Preferably, the control means is arranged to determine the power levels for said signal in the determined beam direction and at least one other beam direction based on the relative energy levels of the first signal received in said determined beam direction and said at least one auxiliary direction. The relative energy levels may be determined by said control means which correlates at least a portion of the received first signal with a known version of that signal or a portion thereof. As will be appreciated, the first signal may comprise or include a training sequence which is a known sequence of data which is correlated with a reference version of that training sequence which is not distorted in order to determine the channel impulse response. This information may be used to determine the relative power levels and may be used to determine the principal direction.

The transmitter means may be arranged to provide a radiation beam in a plurality of beam directions, wherein each of the beam directions is individually selectable.

Preferably, transmission power for each of the beam directions is individually determinable, wherein the transmission power of the beam in the or each auxiliary direction is less than the transmission power in the principal beam direction.

The present invention is particularly applicable to cellular communication networks. In such networks, the first station may be a base transceiver station whilst the second station is a mobile station. However, it is appreciated that embodiments of the invention may be applicable to any other type of radio communication network such as PCN (Private Communication Networks) or the like.

For a better understanding of the present invention and as to how the same may be carried into effect, reference will now be made by way of example to the accompanying drawings in which.

Figure 1:
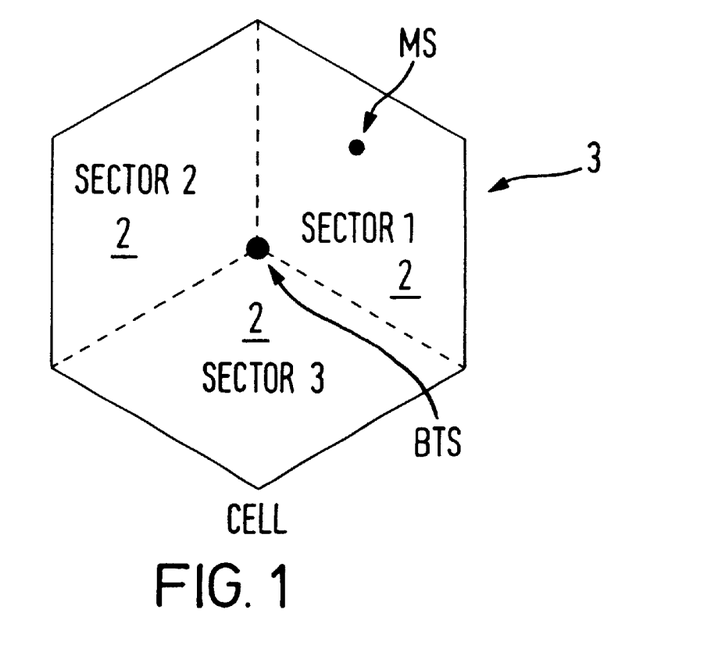
FIG. 1 shows a schematic view of a base transceiver station (BTS) and its associated cell sectors.

Reference will first be made to FIG. 1 which shows three cell sectors 2 defining a cell 3 of a cellular mobile telephone network. The three cell sectors 2 are served by respective base transceiver stations (BTS) 4. Three separate base transceiver stations 4 are provided at the same location. Each BTS 4 has a transceiver which transmits and receives signals to and from a respective one of the three cell sectors 2. Thus, one dedicated base transceiver station is provided for each cell sector 2. Each BTS 4 is thus able to communicate with mobile stations (MS) such as mobile telephones which are located in respective cell sectors 2.

The present embodiment is described in the context of a GSM (Global System for Mobile Communications) network. In the GSM system, a frequency/time division multiple access F/TDMA system is used. Data is transmitted between the BTS 4 and the MS in bursts. The data bursts include a training sequence which is a known sequence of data. The purpose of the training sequence will be described hereinafter. Each data burst is transmitted in a given frequency band in a predetermined time slot in that frequency band. The use of a directional antenna array allows space division multiple access also to be achieved. Thus, in embodiments of the present invention, each data burst will be transmitted in a given frequency band, in a given time slot, and in a given direction An associated channel can be defined for a given data burst transmitted in the given frequency, in the given time slot, and in the given direction. As will be discussed in more detail hereinafter, in some embodiments of the present invention, the same data burst is transmitted in the same frequency band, in the same time slot but in two different directions.

Figure 2:
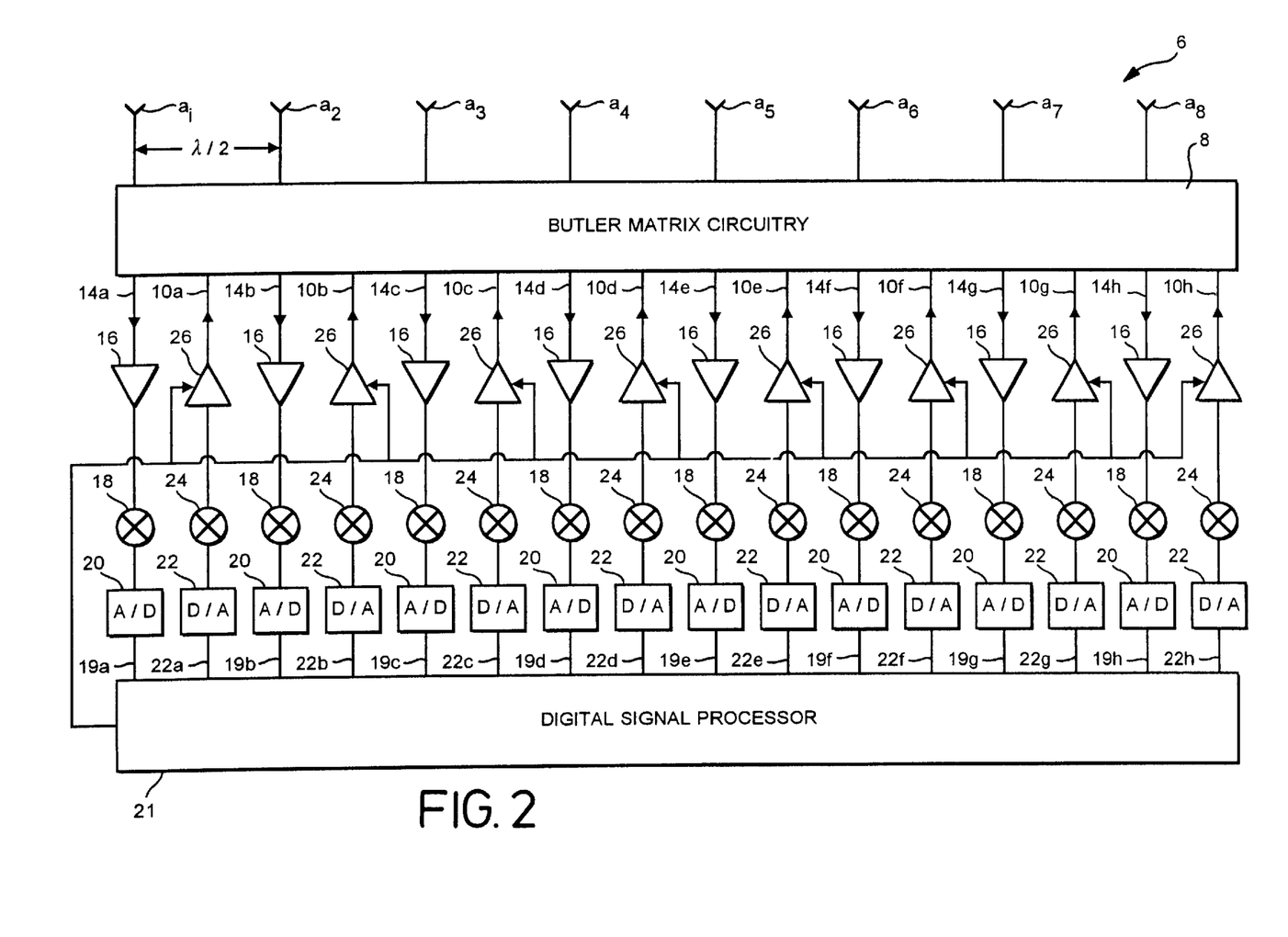
FIG. 2 shows a simplified representation of an antenna array and the base transceiver station.

FIG. 2 shows a schematic view of one antenna array 6 of one BTS 4 which acts as a transceiver. It should be appreciated that the array 6 shown in FIG. 2 only serves one of the three cell sectors 2 shown in FIG. 1. Another two antenna arrays 6 are provided to serve the other two cell sectors 2. The antenna array 6 has eight antenna elements $a_1 \ldots a_8$. The elements $a_1 \ldots a_8$ are arranged to have a spacing of a half wavelength between each antenna element $a_1 \ldots a_8$ and are arranged in a horizontal row in a straight line. Each antenna element $a_1 \ldots a_8$ is arranged to transmit and receive signals and can have any suitable construction. Each antenna element $a_1 \ldots a_8$ may be a dipole antenna, a patch antenna or any other suitable antenna. The eight antenna elements $a_1 \ldots a_8$ together define a phased array antenna 6.

As is known, each antenna element $a_1 \ldots a_8$ of the phased array antenna 6 is supplied with the same signal to be transmitted to a mobile station MS. However, the phases of the signals supplied to the respective antenna elements $a_1 \ldots a_8$ are shifted with respect to each other. The differences in the phase relationship between the signals supplied to the respective antenna elements $a_1 \ldots a_8$ gives rise to a directional radiation pattern. Thus, a signal from the BTS 4 may only be transmitted in certain directions in the cell sector 2 associated with the array 6. The directional radiation pattern achieved by the array 6 is a consequence of constructive and destructive interference which arises between the signals which are phase shifted with respect to each other and transmitted by each antenna element $a_1 \ldots a_8$. In this regard, reference is made to FIG. 3 which illustrates the directional radiation pattern which is achieved with the antenna array 6. The antenna array 6 can be controlled to provide a beam $b_1 \ldots b_8$ in any one of the eight directions illustrated in FIG. 3. For example, the antenna array 6 could be controlled to transmit a signal to a MS only in the direction of beam $b_5$ or only in the direction of beam $b_6$. As will be discussed in further detail hereinafter, it is possible also to control the antenna array 6 to transmit a signal in more than one beam direction at the same time. For example, a signal may be transmitted in the two directions defined by beam $b_5$ and beam $b_6$.

Figure 3:
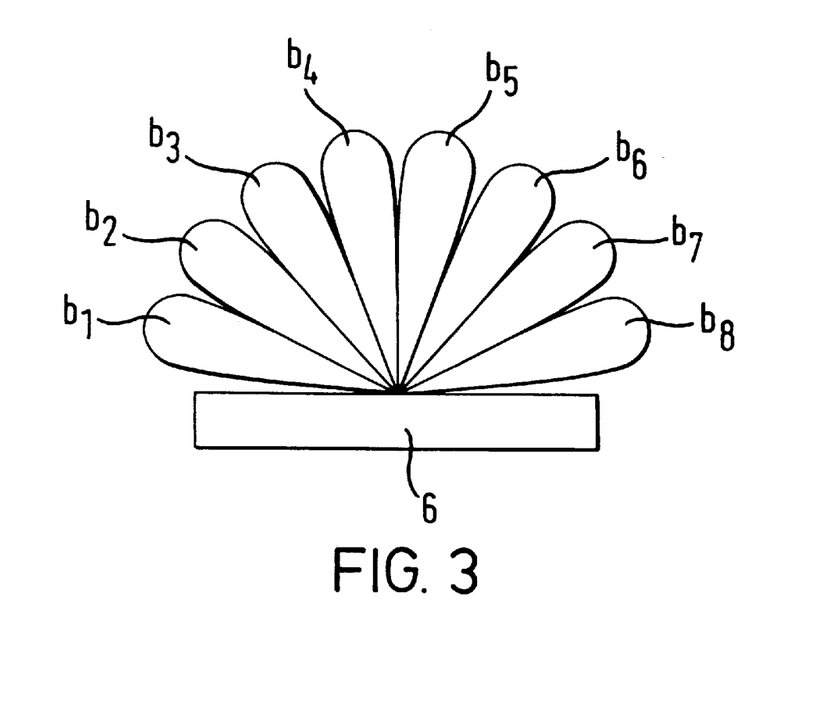
FIG. 3 shows the fixed beam pattern provided by the antenna array of FIG. 2.

FIG. 3 is only a schematic representation of the eight possible beam directions which can be achieved with the antenna array 6. In practice, however, there will in fact be an overlap between adjacent beams to ensure that all of the cell sector 2 is served by the antenna array 6.

The relative phase of the signal provided at each antenna element $a_1 \ldots a_8$ is controlled by Butler matrix circuitry 8 so that a signal can be transmitted in the desired beam direction or directions. The Butler matrix circuitry 8 thus provides a phase shifting function. The Butler matrix circuitry 8 has eight inputs 10*a*–*h* from the BTS 4 and eight outputs, one to each antenna element $a_1 \ldots a_8$. The signals received by the respective inputs 10*a*–*h* comprise the data bursts to be transmitted. Each of the eight inputs 10*a*–*h* represents the beam direction in which a given data burst could be transmitted. For example, when the Butler matrix circuitry 8 receives a signal on the first input 10*a*, the Butler matrix circuitry 8 applies the signal provided on input 10*a* to each of the antenna elements $a_1 \ldots a_8$ with the required phase differences to cause beam $b_1$ to be produced so that the data burst is transmitted in the direction of beam $b_1$. Likewise, a signal provided on input 10*b* causes a beam in the direction of beam $b_2$ to be produced and so on.

As already discussed, the antenna elements $a_1 \ldots a_8$ of the antenna array 6 receive signals from a MS as well as transmit signals to a MS. A signal transmitted by a MS will generally be received by each of the eight antenna elements $a_1 \ldots a_8$. However, there will be a phase difference between each of the signals received by the respective antenna elements $a_1 \ldots a_8$. The Butler matrix circuitry 8 is therefore able to determine from the relative phases of the signals received by the respective antenna elements $a_1 \ldots a_8$ the beam direction from which the signal has been received. The Butler matrix circuitry 8 thus has eight inputs, one from each of the antenna elements $a_1 \ldots a_8$ for the signal received by each antenna element. The Butler matrix circuitry 8 also has eight outputs 14*a*–*h*. Each of the outputs 14*a* to 14*h* corresponds to a particular beam direction from which a given data burst could be received. For example, if the antenna array 6 receives a signal from a MS from the direction of beam $b_1$, then the Butler matrix circuitry 8 will output the received signal on output 14*a*. A received signal from the direction of beam $b_2$ will cause the received signal to be output from the Butler matrix circuitry 8 on output 14*b* and so on. In summary, the Butler matrix circuitry 8 will receive on the antenna elements $a_1 \ldots a_8$ eight versions of the same signal which are phase shifted with respect to one another. From the relative phase shifts, the Butler matrix circuitry 8 determines the direction from which the received signal has been received and outputs a signal on a given output 14*a*–*h* in dependence on the direction from which the signal has been received.

It should be appreciated that in some environments, a single signal or data burst from a MS may appear to come from more than one beam direction due to reflection of the signal whilst it travels between the MS and the BTS 4, provided that the reflections have a relatively wide angular spread. The Butler matrix circuitry 8 will provide a signal on each output 14*a*–*h* corresponding to each of the beam directions from which a given signal or data burst appears to come. Thus, the same data burst may be provided on more than one output 14*a*–*h* of the Butler matrix circuitry 8. However, the signals on the respective outputs 14*a*–*h* may be time delayed with respect to each other.

Each output 14*a*–*h* of the Butler matrix circuitry 8 is connected to the input of a respective amplifier 16 which amplifies the received signal. One amplifier 16 is provided for each output 14*a*–*h* of the Butler matrix circuitry 8. The amplified signal is then processed by a respective processor 18 which manipulates the amplified signal to reduce the frequency of the received signal to the baseband frequency so that the signal can be processed by the BTS 4. To achieve this, the processor 18 removes the carrier frequency component from the input signal. Again, one processor 18 is provided for each output 14*a*–*h* of the Butler matrix circuitry 8. The received signal, which is in analogue form, is then converted into a digital signal by an analogue to digital (A/D) converter 20. Eight A/D converters 20 are provided, one for each output 14*a*–*h* of the Butler matrix circuitry 8. The digital signal is then input to a digital signal processor 21 via a respective input 19*a*–*h* for further processing.

The digital signal processor 21 also has eight outputs 22*a*–*h*, each of which outputs a digital signal which represents the signal which is to be transmitted to a given MS. The output 22*a*–*h* selected represents the beam direction in which the signal is to be transmitted. That digital signal is converted to an analogue signal by a digital to analogue (D/A) converter 23. One digital to analogue converter 23 is provided for each output 22*a*–*h* of the digital signal processor 21. The analogue signal is then processed by processor 24 which is a modulator which modulates onto the carrier frequency the analogue signal to be transmitted. Prior to the processing of the signal by the processor 24, the signal is at the baseband frequency. The resulting signal is then amplified by an amplifier 26 and passed to the respective input 10*a*–*h* of the Butler matrix circuitry 8. A processor 24 and an amplifier 26 are provided for each output 22*a*–*h* of the digital signal processor 21.

Figure 4:
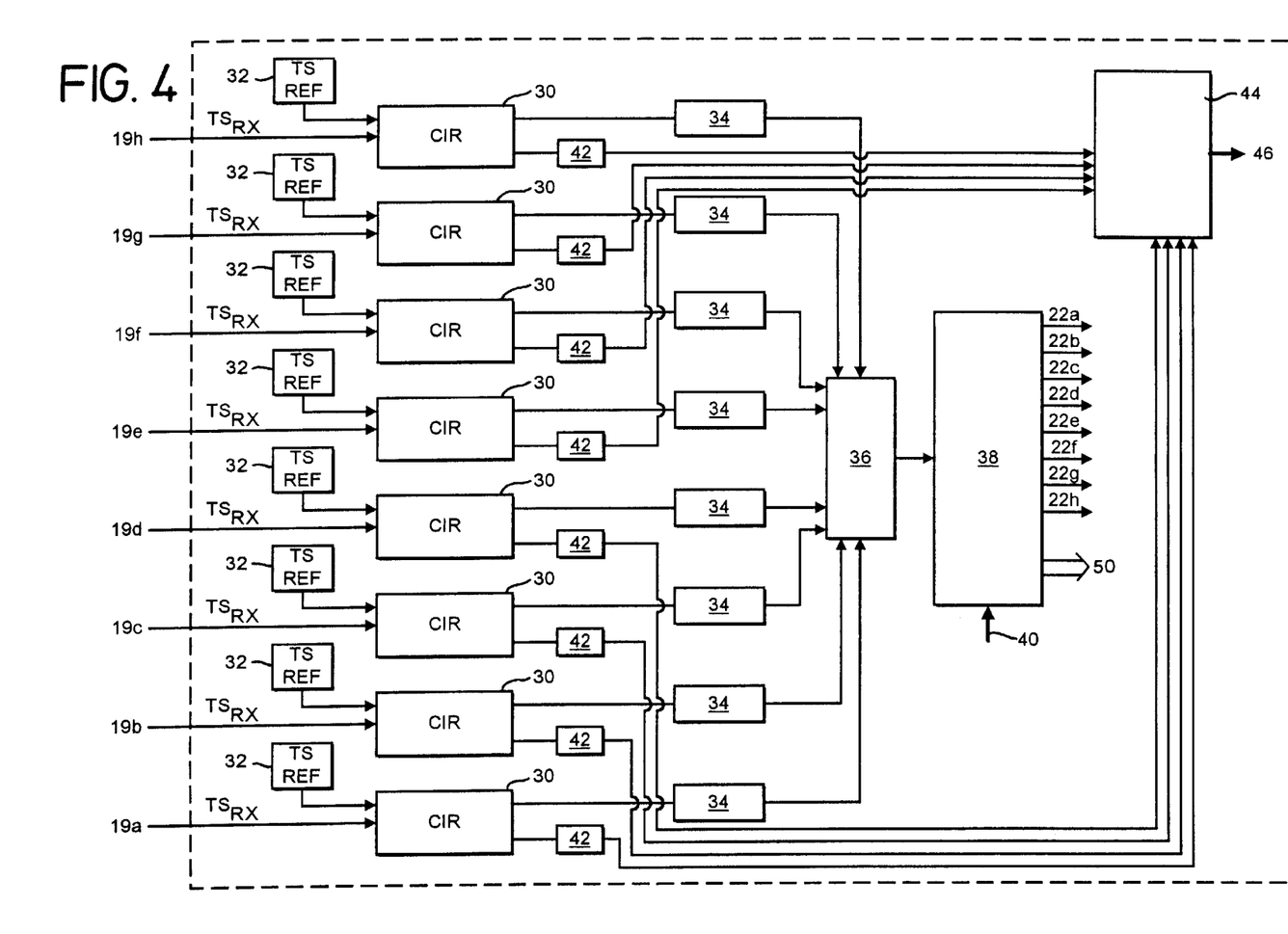
FIG. 4 shows a schematic view of the digital signal processor of FIG. 2.

Reference will now be made to FIG. 4 which schematically illustrates the digital signal processor 21. It should be appreciated that the various blocks illustrated in FIG. 4 do not necessarily correspond to separate elements of an actual digital signal processor 21 embodying the present invention. In particular, the various blocks illustrated in FIG. 4 correspond to various functions carried out by the digital signal processor 21. In one embodiment of the present invention, the digital signal processor 21 is at least partially implemented in integrated circuitry and several functions may be carried out by the same element.

Each signal received by the digital signal processor 21 on the respective inputs 19*a*–*h* is input to a respective channel impulse response (CIR) estimator block 30. The CIR estimator block 30 includes memory capacity in which the estimated channel impulse response is stored. The CIR estimator block also includes memory capacity for temporarily storing the received signal. The channel impulse response estimator block 30 is arranged to estimate the channel impulse response of the channel of the respective input 19*a–h*. As already discussed an associated channel can be defined for the given data burst transmitted in the selected frequency band, the allocated time slot and the beam direction from which the signal is received. The beam direction from which a signal is received is ascertained by the Butler matrix circuitry 8 so that a signal received at input 19*a* of the digital signal processor represents mainly the signal that has been received from the direction of beam $b_1$ and so on. It should be appreciated that the signal received at a given input may also include the side lobes of the signal received on, for example, adjacent inputs.

Each data burst which is transmitted from a mobile station MS to the BTS 4 includes a training sequence TS. However, the training sequence $TS_{RX}$ which is received by the BTS 4 is affected due to noise and also due to multipath effects which leads to interference between adjacent bits of the training sequence. This latter interference is known as intersymbol interference. $TS_{RX}$ is also affected by interference from other mobile stations, for example mobile stations located in other cells or cell sectors using the same frequency which may cause co-channel interference. As will be appreciated, a given signal from the MS may follow more than one path to reach the BTS and more than one version of the given signal may be detected by the antenna array 6 from a given direction. The training sequence $TS_{RX}$ which is received from input 19*a* is cross correlated by the CIR estimator block 30 with a reference training sequence $TS_{REF}$ stored in a data store 32. The reference training sequence $TS_{REF}$ is the same as the training sequence which is initially transmitted by the mobile station. In practice the received training sequence $TS_{RX}$ is a signal modulated onto a carrier frequency while the reference training sequence $TS_{REF}$ is stored as a bit sequence in the data store 32. Accordingly, before the cross-correlation is carried out, the stored reference training sequence is similarly modulated. In other words the distorted training sequence received by the BTS 4 is correlated with the undistorted version of the training sequence. In an alternative embodiment of the invention, the received training sequence is demodulated prior to its correlation with the reference training sequence. In this case, the reference training sequence would again have the same form as the receiving training sequence. In other words, the reference training sequence is not modulated.

The reference training sequence $TS_{REF}$ and the received training sequence $TS_{RX}$ each are of length L corresponding to L bits of data and may for example be 26 bits. The exact location of the received training sequence $TS_{RX}$ within the allocated time slot may be uncertain. This is because the distance of the mobile station MS from the BTS 4 will influence the position of the data burst sent by the MS within the allotted time slot. For example, if a mobile station MS is relatively far from the BTS 4, the training sequence may occur later in the allotted time slot as compared to the situation where the mobile station MS is close to the BTS 4.

To take into account the uncertainty of the position of the received training sequence $TS_{RX}$ within the allotted time slot, the received training sequence $TS_{RX}$ is correlated with the reference training sequence $TS_{REF}$ n times. Typically, n may be 7 or 9. It is preferred that n be an odd number. The n correlations will typically be on either side of the maximum obtained correlation. The relative position of the received training sequence $TS_{RX}$ with respect to the reference training sequence $TS_{REF}$ is shifted by one position between each successive correlation. Each position is equivalent to one bit in the training sequence and represents one delay segment. Each single correlation of the received training sequence $TS_{RX}$ with the reference training sequence $TS_{REF}$ gives rise to a tap which is representative of the channel impulse response for that correlation. The n separate correlations gives rise to a tap sequence having n values.

Figure 5:
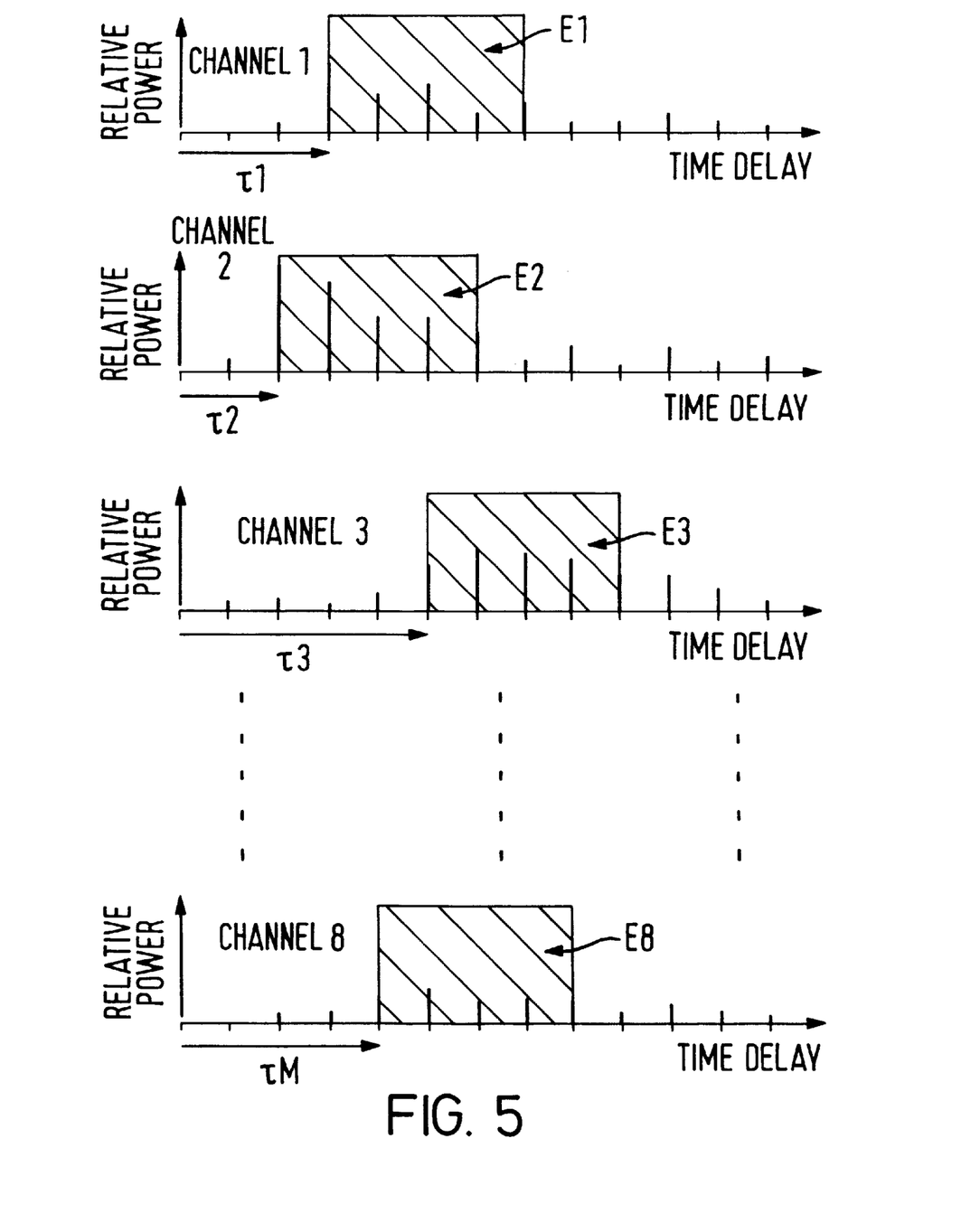
FIG. 5 illustrates the channel impulse response for four channels, out of the eight channels.

Reference is now made to FIG. 5 which shows the channel impulse response for four of the eight possible channels corresponding to the eight spacial directions. In other words, FIG. 5 shows the channel impulse response for four channels corresponding to a given data burst received in four of the eight beam directions from the mobile station, the data burst being in a given frequency band and in a given time slot. The x axis of each of the graphs is a measure of time delay whilst the y axis is a measure of relative power. Each of the lines (or taps) marked on the graph represents the multipath signal received corresponding to a given correlation delay Each graph will have n lines or taps, with one tap corresponding to each correlation.

From the estimated channel impulse response, it is possible to determine the location of the training sequence within the allotted time slot. The largest tap values will be obtained when the best correlation between the received training sequence $TS_{RX}$ and the reference training sequence $TS_{REF}$ is achieved.

The CIR estimator block 30 also determines for each channel the five (or any other suitable number) consecutive taps which give the maximum energy. The maximum energy for a given channel is calculated as follows:

$$E = \sum_{j=1}^{5} (h_j)^2$$

where h represents the tap amplitude resulting from a cross correlation of the reference training sequence $TS_{REF}$ with the received training sequence $TS_{RX}$. The CIR estimator block 30 estimates the maximum energy for a given channel by using a sliding window technique. In other words, the CIR estimator block 30 considers each set of five adjacent values and calculates the energy from those five values. The five adjacent values giving the maximum energy are selected as representative of the impulse response of that channel.

The energy can be regarded as being a measure of the strength of the desired signal from a given MS received by the BTS 4 from a given direction. This process is carried out for each of the eight channels which represent the eight different directions from which the same data burst could be received. The signal which is received with the maximum energy has followed a path which provides the minimum attenuation of that signal.

An analysis block 34 is provided which stores the maximum energy calculated by the CIR estimator block 30 for the respective channel for the five adjacent values selected by the CIR estimator block as being representative of the channel impulse response. The analysis block 34 may also analyse the channel impulse responses determined by the CIR estimator block 30 to ascertain the minimum delay. The delay is a measure of the position of the received training sequence $TS_{RX}$ in the allotted time slot and hence is a relative measure of the distance travelled by a signal between the mobile station and the BTS 4. The channel with the minimum delay has the signal which has travelled the shortest distance. This shortest distance may in certain cases represent the line of sight path between the mobile station MS and the BTS 4.

The analysis block 34 is arranged to determine the position of the beginning of the window determining the five values providing the maximum energy. The time delay is then determined based on the time between a reference point and the beginning of the window. That reference point may be the common time when all received training sequences in each branch start to be correlated, the time corresponding to the earliest window edge of all the branches or a similar common point. In order to accurately compare the various delays of the different channels, a common timing scale is adopted which relies on the synchronisation signal provided by the BTS 4 in order to control the TDMA mode of operation. In other words, the position of the received training sequence $TS_{RX}$ in the allotted time slot is a measure of the time delay. It should be appreciated that in known GSM systems, the delay for a given channel is calculated in order to provide timing advance information. Timing advance information is used to ensure that a signal transmitted by the mobile station to the BTS falls within its allotted time slot. The timing advance information can be determined based on the calculated relative delay and the current timing advance information. If the mobile station MS is far from the base station, then the MS will be instructed by the BTS to send its data burst earlier than if the mobile station MS is close to the BTS.

The results of the analysis carried out by each of the analysis blocks 34 are input to a comparison block 36. The comparison block 34 compares the maximum energy determined for each channel and may also compare the determined delay for each channel. The comparison block 36 ascertains which channel has the maximum energy for a given data burst in a given frequency band in a given time slot. This means that the beam direction from which the strongest version of a given data burst is received can be ascertained. This direction is the principal beam direction which will be used by the BTS to transmit a signal to the MS. The comparison block 36 may also ascertain which of the channels has a minimum delay. In other words, the channel having the data burst which has followed the shortest path can also be ascertained. This beam direction may alternatively be selected as the determined principal beam direction by comparison block 36.

The comparison block 36 thus selects the beam direction from which the strongest version of a given data burst is received from the mobile station, this being the principal beam. The comparison block then selects the beam on either side of the principal beam, these two further beams being the auxiliary beams. For example, if beam $b_4$ is selected as the principal beam, the two auxiliary beams will be beams $b_3$ and $b_5$.

The comparison block 36 also determines the power level for the principal beam. The power level of principal beam can be selected in a number of different ways. For example, where the delay is relatively small, a relatively low power is selected whilst if the delay is relatively long, the power may be selected to be relatively large. The determining of the power level of the principal beam may also take into account the current timing advance information used by the MS to send a signal to the BTS. Alternatively, the energy determined from the channel impulse response for the signal received from the principal beam direction may be used in the determination of the power level for the signal in the principal beam direction. These are open loop methods. However, any other suitable method can be also used to determine the power level of the principal beam. For example, the power level for the signal in the principal beam direction could be determined based on a power measurement report received by the BTS for the corresponding MS. This is a closed loop method.

The comparison block 36 also calculates the power level to be used with the auxiliary beams for transmitting a signal to the MS. If the principal beam is the i beam, that ith beam will have a power $P_i$ which has been selected as outlined above. The auxiliary beams will be the i+1 beam and the i−1 beam, that is the two beams on either side of the principal beam. The power of the i−1 beam is defined as $P_i/a$ whilst the power of the i+1 beam is defined as $P_i/b$ where a and b are both greater than or equal to 1.

There are a number of different ways in which the values of a and b can be selected. In one embodiment, a is proportional to $E_i/E_{i-1}$ where $E_i$ is the energy calculated from the channel impulse response for the signal received from the MS in the i beam direction whilst $E_{i-1}$ is the energy calculated from the channel impulse response for the signal received from the mobile station in the i−1 beam direction. Similarly, b is proportional to $E_i/E_{i+1}$, $E_{i+1}$ being the energy calculated from the channel impulse response for the signal received from the mobile station in the i+1 beam direction.

It should be appreciated that the value of E for each beam can be calculated as previously described.

If $E_{i-1}$ and $E_{i+1}$ are very much less than $E_i$, then a signal will be transmitted to the mobile station MS by the BTS 4 only in the direction of the principal beam. If $E_{i+1}$ and $E_i$ are similar to $E_i$, then the principal beam and the two auxiliary beams will have the same power. However, in most cases, the power of the principal beam will be greater than that of the auxiliary beams.

The comparison block 36 therefore provides an output to generating block 38 which indicates which beams are to be used to transmit signals from the BTS 4 to the MS and also the appropriate power level to be used with each of those beams. The power levels may be absolute power levels or may only provide information on the relative power levels for the signal in the principal and auxiliary beam directions.

In certain embodiments, the principal beam may be the first or eighth beam ie. beam $b_1$ or $b_8$. In those circumstances, only a single auxiliary beam would be provided.

In one embodiment of the present invention, a and b are calculated based on the calculated energy for a single received data burst from the MS in the given beam direction. Alternatively, a and b can be calculated based on the average calculated energy for N preceding bursts, where N may be any suitable number. For example, N could be five. For the i−1 beam, the energy for each of five preceding data bursts received in the i−1 beam direction would be calculated from the respective channel impulse response. An average energy value would then be calculated which would be used to determine a. Similarly, b could be calculated on the basis of the N preceding bursts received from the i+1 beam direction. In one embodiment, the power of the principal beam i can be updated on a burst by burst basis. In other words, the power in the principal beam is determined based on the preceding signal received from the mobile station in the direction of the principal beam. Thus, the power of the principal beam can be updated on every burst to rapidly try to follow changes affecting the path between the BTS and the MS. However, the auxiliary beam power can be controlled using information received over N previous bursts. Thus, the auxiliary beams may attempt to increase the level of signal received by the mobile station and act as diversity paths that slowly respond to changes in the path between the BTS and the MS.

In one further embodiment of the present invention, a and b have predetermined fixed values which fix the power levels of the auxiliary beams at a predetermined percentage of the power level of the principal beam.

The above described embodiment is particularly appropriate for those situations where the mobile station is located relatively far from the BTS that is greater than a critical distance. This critical radius is dependent on the environment of each individual cell that may typically be around 0.5 to 1 km. When the distance between the BTS and the MS is greater than the critical distance, the bulk of the energy received from the MS is distributed among a relatively few beam directions. In particular, the energy will be mainly concentrated in one or two beams, or possibly three beam directions. However, when the distance between the mobile station and the BTS is less than the critical distance, the received desired energy will appear in general to be distributed among a much greater number of beams. Accordingly, in embodiments of the present invention, the use of the principal and auxiliary beams may only be used in those situations where the distance between the MS and the BTS 4 is greater than the critical distance. When the distance between the MS and the BTS is less than the critical distance, the BTS 4 will transmit signals to the MS over a relatively large-number of beam directions, for example 4 or more. The power level used when transmitting over a relatively wide angular spread will generally be lower than the power used for the principal beam when the distance between the MS and the BTS 4 is greater than the critical distance.

Any suitable method can be used to determine whether or not the distance between the MS and the BTS is greater than the critical distance. In one embodiment, the comparison block 36 compares the channel impulse response obtained for each of the possible directions. If most of the received energy is distributed in three or less beam directions, then it is assumed that the distance between the BTS and MS is greater than the critical distance. Alternatively, if most of the received energy is received from 4 or more beam directions, then it is assumed that the distance between the MS and the BTS is less than the critical distance.

It is also possible for the comparison block to use the timing advance information in order to determine whether or not the distance between the MS and BTS is greater or less than the critical distance. This method is preferred in some embodiments of the invention as it gives more accurate results than the previously outlined method.

The above described embodiment uses a single analogue beam former in the form of a Butler matrix. However, in one modification to the above described embodiment, two beam formers may be used, for example a Butler matrix and its spatial complementary matrix. Two beam formers are complementary if they generate spatially interleaved beams covering approximately the same region. The principal beam may then be generated by one beam former whilst the auxiliary beams may be generated by the complementary beam former. Thus, the auxiliary beams would substantially overlap the principal beam. The extent of overlap would be very much greater than that which is achieved by two adjacent beams generated by single beam former.

It should be appreciated that in embodiments of the present invention, the three beams may all have different power levels. However, in some embodiments, the power of the two auxiliary beams may be selected always to have the same value.

Generating block 38 is responsible for generating the signals which are to be output from the digital signal processor 21. The generating block 38 has an input 40 representative of the speech and/or information to be transmitted to the mobile station MS. Generating block 38 is responsible for encoding the speech or information to be sent to the mobile station MS and includes a training sequence and a synchronising sequence within the signals. Block 38 is also responsible for production of the modulating signals. Based on the generated signal and determined beam direction, generating block 38 provides signals on the respective outputs $22a$–$h$ of the digital signal processor 21. The generating block 38 also provides an output 50 which is used to control the amplification provided by amplifiers 24 to ensure that the signals in the principal and auxiliary beam directions have the required power levels.

The output of the channel impulse response block 30 is also used to equalise and match the signals received from the mobile station MS. In particular, the effects of intersymbol interference resulting from multipath propagation can be removed or alleviated from the received signal by the matched filter (MF) and equaliser block 42. It should be appreciated that the matched filter (MF) and equalizer block has an input (not shown) to receive the received signal from the MS. The output of each block 42 is received by recovery block 44 which is responsible for recovering the speech and/or the information sent by the MS. The steps carried out by the recovery block include demodulating and decoding the signal. The recovered speech or information is output on output 46.

It should be appreciated that whilst the above described embodiment has been implemented in a GSM cellular communication network, it is possible that the present invention can be used with other digital cellular communication networks as well as analogue cellular networks. The above described embodiment uses a phased array having eight elements. It is of course possible for the array to have any number of elements. Alternatively, the phased array could be replaced by discrete directional antennae each of which radiates a beam in a given direction. The Butler matrix circuitry can be replaced by any other suitable phase shifting circuitry, where such circuitry is required. The Butler matrix circuitry is an analogue beam former. It is of course possible to use a digital beam former DBF or any other suitable type of analogue beam former. The array may be controlled to produce more than eight beams, even if only eight elements are provided, depending on the signals supplied to those elements.

It is also possible for a plurality of phased arrays to be provided. The phased arrays may provide a different number of beams. When a wide angular spread is required, the array having the lower number of elements is used and when a relatively narrow beam is required, the array having the larger number of elements is used.

As will be appreciated, the above embodiment has been described as providing eight outputs from the Butler matrix circuitry. It should be appreciated that in practice a number of different channels will be output on each output of the Butler matrix at the same time. Those channels may be different frequency bands. The channels for different time slots will also be provided on the respective outputs. Whilst individual amplifiers, processors, analogue to digital converters and digital to analogue converters have been shown, these in practice may be each provided by a single element which has a plurality of inputs and outputs.

It should be appreciated that embodiments of the present invention have applications other than just in cellular communication networks. For example, embodiments of the present invention may be used in any environment which requires directional radio communication. For example, this technique may be used in PMR (Private Radio Networks) or the like.

I claim:

1. A method of directional radio communication between a first station and a second station, said method comprising the steps of:

receiving at said first station a first signal transmitted from said second station, said first signal being receivable from a plurality of different directions;

determining a principal beam direction from which said first signal is received by said first station;

defining at the first station a plurality of beam directions for transmitting a radiation beam, wherein each of said beam directions is selectable; and selecting at said first station said determined principal beam direction and at least one other auxiliary beam direction, said at least one auxiliary beam direction being adjacent to said determined principal beam direction and transmitting a second signal from said first station to said second station in said selected beam directions, wherein the transmission power in each of said beam directions is individually determinable and wherein the strength of the second signal transmitted in said at least one auxiliary direction is less than or equal to the strength of the second signal transmitted in said determined principal direction, and wherein the ratio of the strength of the second signal transmitted in said at least one auxiliary direction to the strength of the second signal transmitted in said determined principal direction is proportional to the ratio of the strength of the first signal received by said first station from said at least one auxiliary direction to the strength of the first signal received by the first station in said determined principal direction.

2. A method as claimed in claim 1, wherein said two ratios are substantially equal.

3. A method as claimed in claim 1, wherein the strength of said signal transmitted in said at least one auxiliary beam direction is determined in dependence on a parameter of the first signal received in said at least one auxiliary direction.

4. A method as claimed in claim 1, wherein at least one auxiliary direction comprises the beam directions on either side of the determined principal direction.

5. A method as claimed in claim 1, wherein the direction from which the strongest version of the first signal is received is determined to be said principal direction.

6. A method as claimed in claim 1, wherein the direction from which a version of first signal is first received is determined to be the principal direction.

7. A method as claimed in claim 1, wherein if the strength of the first signal received in said at least one other auxiliary direction is very much smaller than the strength of the first signal received in the determined principal direction, then said second signal transmitted from said first station to said second station is only transmitted in said determined principal direction.

8. A method as claimed in claim 1, wherein if the strength of the first signal received in said determined principal direction and in said at least one auxiliary direction are substantially the same, then the first station is arranged to transmit the second signal in said determined principal direction and in at least one other auxiliary direction at substantially the same signal strength.

9. A method as claimed in claim 1, wherein the strength of the second signal transmitted by the first station in at least one of said determined principal directions and the at least one auxiliary direction is dependent on the strength of the first signal received by said first station in the corresponding direction.

10. A method as claimed in claim 1, wherein the strength of the second signal in at least one of said determined principal directions and at least one auxiliary direction is dependent on the average strength of a plurality of preceding signals received by said first station from said second station in the corresponding direction.

11. A method as claimed in claim 1, including the step of determining if the distance between the second station and the first station is below a predetermined value, and if so then the second signal transmitted from said first station to said second station is transmitted with a relatively wide angular spread.

12. A method as claimed in claim 1, wherein said first station is a base transceiver station in a cellular network system.

13. A method as claimed in claim 1, wherein said second station is a mobile station.

14. A first station for directional radio communication with a second mobile station, said first station comprising:

receiver for receiving a first signal transmitted by said second station, said first signal being receivable from a plurality of different directions;

circuitry for determining the principal direction from which said first signal is received;

a transmitter for transmitting a second signal from the first station to the second station, said transmitter being arranged to transmit a radiation beam in a plurality of beam directions, wherein each of said beam directions is selectable; and a controller for controlling said transmitter, wherein said controller is arranged to control the transmitter to transmit said second signal to said second station in the determined principal beam direction, said at least one auxiliary direction being adjacent to the determined principal direction, wherein the transmission power in each of said beam directions is individually determinable and wherein the strength of the second signal transmitted in said at least one auxiliary direction is less than or equal to the strength of the second signal transmitted in said determined principal direction, wherein the ratio of the strength of the second signal transmitted in said at least one auxiliary direction to the strength of the second signal transmitted in said determined principal direction is proportional to the ratio of the strength of the first signal received by said first station from said at least one auxiliary direction to the strength of the first signal received by the first station in said determined principal direction.

15. A first station as claimed in claim 14, wherein said receiver and said transmitter comprise an antenna array which is arranged to provide a plurality of signal beams in a plurality of different directions.

16. A first station as claimed in claim 14, wherein the controller is arranged to select the strength of said second signal in said auxiliary direction in dependence on a parameter of the first signal received in said at least one auxiliary direction.

17. A first station as claimed in claim 15, wherein the controller is arranged to select the strength of said second signal in said auxiliary direction in dependence on a parameter of the first signal received in said at least one auxiliary direction.

* * * * *